(12) United States Patent
Lin et al.

(10) Patent No.: US 11,775,097 B2
(45) Date of Patent: Oct. 3, 2023

(54) FLEXIBLE DISPLAY INPUT DEVICE

(71) Applicant: TPK Touch Solutions (Xiamen) Inc., Fujian (CN)

(72) Inventors: Wei Yi Lin, Taoyuan (TW); Chia Te Cho, Taichung (TW); Zhi Juan Lin, Zhangzhou (CN); Ching-Kai Cho, Changhua County (TW); Ming-Hsien Ko, Taichung (TW)

(73) Assignee: TPK Touch Solutions (Xiamen) Inc., Fujian (CN)

(*) Notice: Subject to any disclaimer, the term of this patent is extended or adjusted under 35 U.S.C. 154(b) by 0 days.

(21) Appl. No.: 17/586,932

(22) Filed: Jan. 28, 2022

(65) Prior Publication Data
US 2023/0244335 A1     Aug. 3, 2023

(51) Int. Cl.
*G06F 3/041* (2006.01)
*H01H 13/705* (2006.01)
*H01H 13/703* (2006.01)

(52) U.S. Cl.
CPC ......... *G06F 3/0412* (2013.01); *H01H 13/705* (2013.01); *G06F 2203/04102* (2013.01); *H01H 13/703* (2013.01)

(58) Field of Classification Search
CPC ........ G06F 3/0412; G06F 2203/04102; H01H 13/705; H01H 13/703
See application file for complete search history.

(56) References Cited

U.S. PATENT DOCUMENTS

| | | | | |
|---|---|---|---|---|
| 2014/0085254 | A1* | 3/2014 | Tenuta | G06F 3/0445 345/174 |
| 2017/0315669 | A1* | 11/2017 | Oh | G06F 3/044 |
| 2019/0393004 | A1 | 12/2019 | Wang et al. | |
| 2021/0278293 | A1* | 9/2021 | Kinokuni | G06F 3/0447 |
| 2021/0382573 | A1* | 12/2021 | Huh | H01Q 9/0407 |

FOREIGN PATENT DOCUMENTS

| | | |
|---|---|---|
| TW | M457915 U | 7/2013 |
| TW | 201533644 A | 9/2015 |
| TW | M604418 U | 11/2020 |

* cited by examiner

*Primary Examiner* — Peter D McLoone
(74) *Attorney, Agent, or Firm* — COOPER LEGAL GROUP, LLC

(57) ABSTRACT

A flexible display input device includes a flexible display layer and a keyswitch layer. The keyswitch layer is disposed under the flexible display layer and includes a first elastic film, a first electrode, a second elastic film, and a second electrode. The first electrode is disposed on a side of the first elastic film facing toward the flexible display layer. The second elastic film is located between the flexible display layer and the first elastic film. The second electrode is disposed on a side of the second elastic film facing toward the first elastic film and is opposite to the first electrode.

20 Claims, 4 Drawing Sheets

FLEXIBLE DISPLAY INPUT DEVICE

BACKGROUND

Technical Field

The present disclosure relates to a flexible display input device.

Description of Related Art

With the diversified development of touch modules, touch modules have been maturely applied to industrial electronics and consumer electronics products. A combination of various types of touch products applied to medium and large size products will become more and more common.

One of the current mainstream capacitive touch technologies is the Film Type. For example, in a conventional capacitive touch module, touch layers (such as indium tin oxide (ITO)) are fabricated on two films respectively, and the outer side is protected by a cover plate such as glass, so it is also called GFF (Glass-Film-Film) structure. Since the detection principle of the capacitive touch technology uses the capacitance change during the touch to determine the touch position, a signal output is generated whenever the touch module is touched. However, this feature is prone to false touch problems in virtual keyboard applications, and the tactile feedback is not as good as traditional keyboards.

Accordingly, how to provide a flexible display input device to solve the aforementioned problems becomes an important issue to be solved by those in the industry.

SUMMARY

An aspect of the disclosure is to provide a flexible display input device that can efficiently solve the aforementioned problems.

According to an embodiment of the disclosure, a flexible display input device includes a flexible display layer and a keyswitch layer. The keyswitch layer is disposed under the flexible display layer and includes a first elastic film, a first electrode, a second elastic film, and a second electrode. The first electrode is disposed on a side of the first elastic film facing toward the flexible display layer. The second elastic film is located between the flexible display layer and the first elastic film. The second electrode is disposed on a side of the second elastic film facing toward the first elastic film and is opposite to the first electrode.

In an embodiment of the disclosure, the keyswitch layer further includes a spacing structure. The spacing structure is disposed and contacted between the first elastic film and the second elastic film.

In an embodiment of the disclosure, the keyswitch layer further includes a supporting structure. The supporting structure is disposed and contacted between the first elastic film and the second elastic film. A lateral distance from the supporting structure to the first electrode and the second electrode is greater than a lateral distance from the spacing structure to the first electrode and the second electrode.

In an embodiment of the disclosure, the flexible display input device further includes a trigger layer. The trigger layer is stacked with the keyswitch layer and includes a trigger member. The trigger member is configured to push the keyswitch layer to make the first electrode contact the second electrode.

In an embodiment of the disclosure, the trigger layer is disposed between the flexible display layer and the keyswitch layer.

In an embodiment of the disclosure, the trigger layer further includes a supporting member. The supporting member is disposed between the flexible display layer and the second elastic film. The trigger member is configured to push the second elastic film.

In an embodiment of the disclosure, the keyswitch layer further includes a supporting structure. The supporting structure is disposed and contacted between the first elastic film and the second elastic film, and is aligned with the supporting member through the second elastic film.

In an embodiment of the disclosure, the keyswitch layer is disposed between the flexible display layer and the trigger layer.

In an embodiment of the disclosure, the trigger layer further includes a supporting member. The supporting member is disposed on and contacted with a side of the first elastic film away from the second elastic film. The trigger member is configured to push the first elastic film.

In an embodiment of the disclosure, the keyswitch layer further includes a supporting structure. The supporting structure is disposed and contacted between the first elastic film and the second elastic film, and is aligned with the supporting member through the first elastic film.

In an embodiment of the disclosure, the flexible display input device further includes a supporting plate. The trigger member is disposed on and contacted with a side of the supporting plate facing the keyswitch layer. The supporting member is disposed and contacted between the first elastic film and the supporting plate.

In an embodiment of the disclosure, a distance between the first elastic film and the second elastic film is greater than about 10 μm and less than about 100 μm.

In an embodiment of the disclosure, the flexible display input device further includes a polarizer. The polarizer is disposed on a side of the flexible display layer away from the keyswitch layer.

In an embodiment of the disclosure, the flexible display input device further includes a touch layer. The touch layer is disposed on a side of the flexible display layer away from the keyswitch layer.

In an embodiment of the disclosure, the flexible display input device further includes a glass layer. The glass layer is disposed on a side of the flexible display layer away from the keyswitch layer.

In an embodiment of the disclosure, the flexible display input device further includes a protective cover plate. The protective cover plate is disposed on a side of the flexible display layer away from the keyswitch layer and has a peripheral light-shielding layer.

In an embodiment of the disclosure, the flexible display input device further includes a first housing and a second housing. The second housing is rotatably connected to the first housing. The keyswitch layer is disposed on the first housing and the flexible display layer covers the keyswitch layer.

In an embodiment of the disclosure, the flexible display input device further includes a first housing and a second housing. The second housing is rotatably connected to the first housing. The keyswitch layer is disposed on the second housing and the flexible display layer covers the keyswitch layer.

In an embodiment of the disclosure, the flexible display layer extends from the first housing to the second housing.

Accordingly, in the flexible display input device of the present disclosure, the flexible display layer can be used to display an input interface (such as a virtual keyboard), and the keyswitch layer under the flexible display layer can be used as the physical trigger mechanism of the input interface, so the flexible display input device not only can effectively solve the problem of accidental touch when using a capacitive touch module as an input device, but also improve tactile feedback. By triggering the keyswitch layer by the trigger member of the trigger layer disposed under the flexible display layer, the accuracy of triggering keyswitches can be increased (because the area required to trigger the keyswitch layer becomes smaller), and the displacement of the flexible display layer when pressed is reduced. By providing the supporting structure in the keyswitch layer and/or the supporting member in the trigger member, the area where the keyswitch layer is squeezed and deformed can be limited, thereby effectively avoiding false triggering of other adjacent keyswitches.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
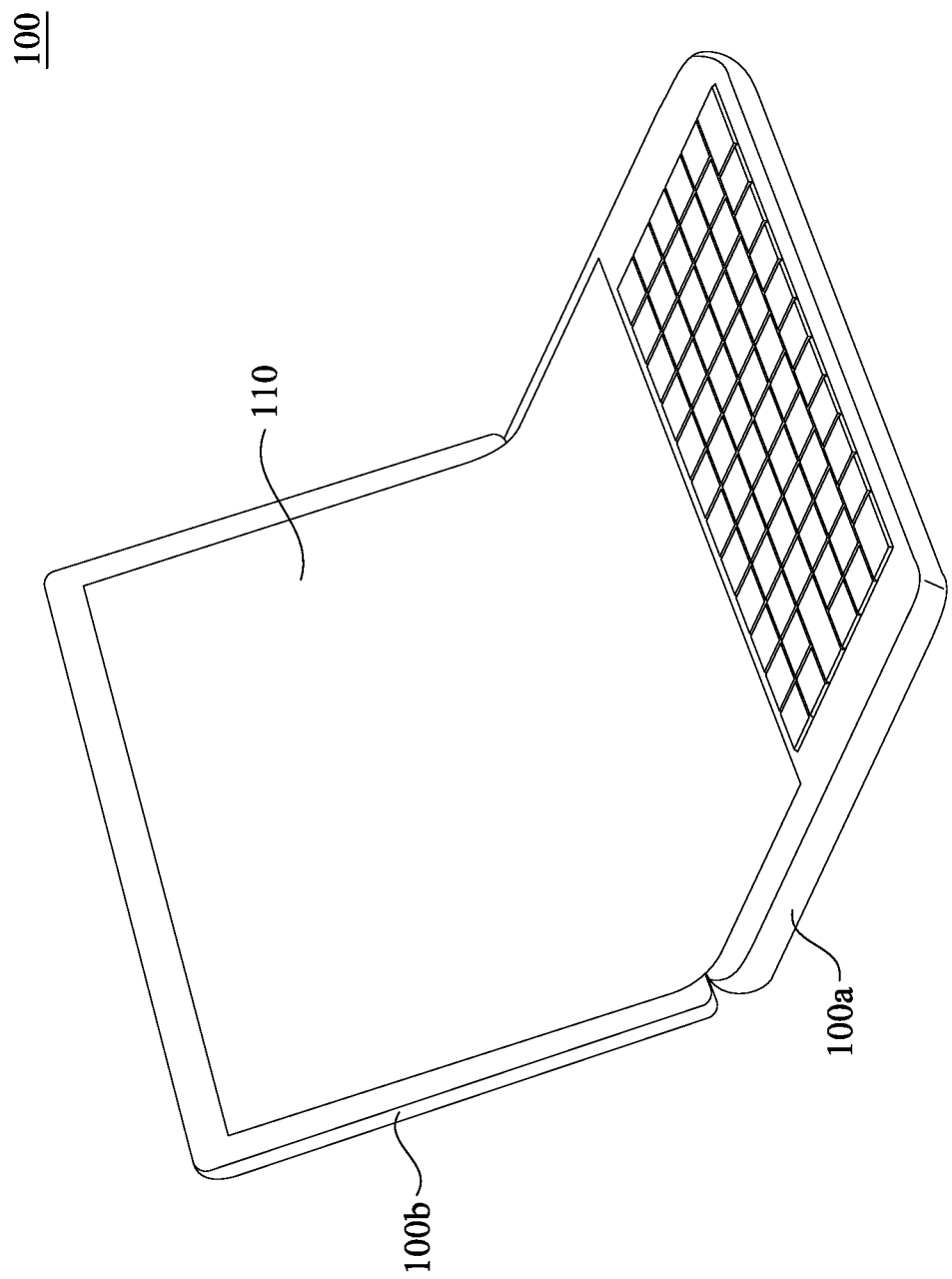
FIG. 1 is a perspective view of a flexible display input device according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 2:
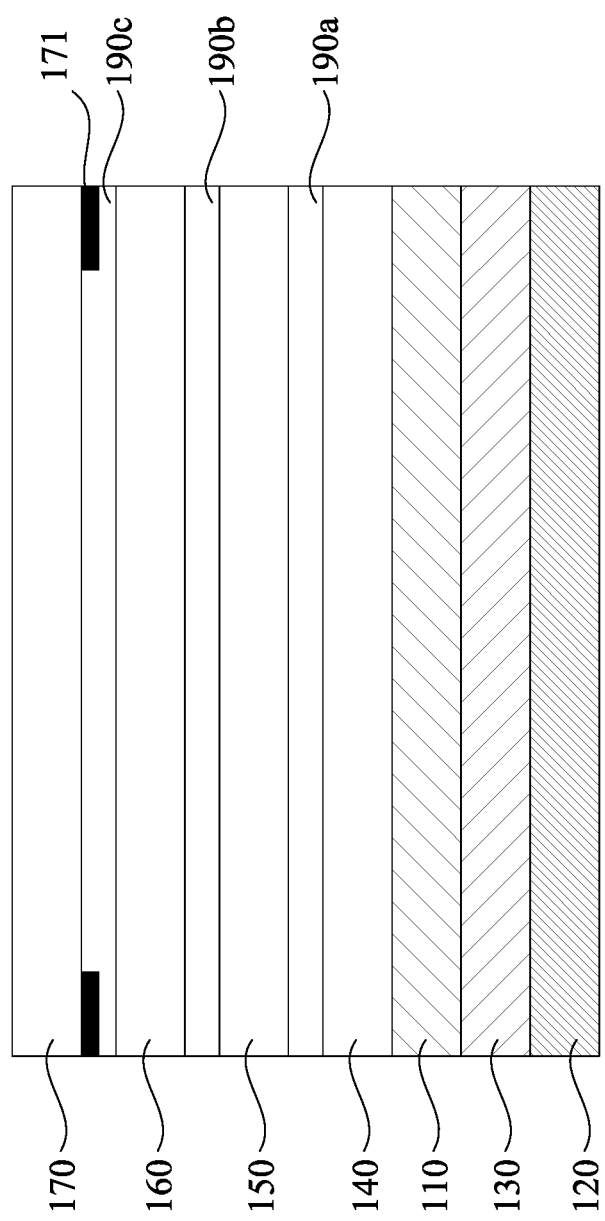
FIG. 2 is a schematic diagram of the flexible display input device according to an embodiment of the present disclosure.
Figure 3:
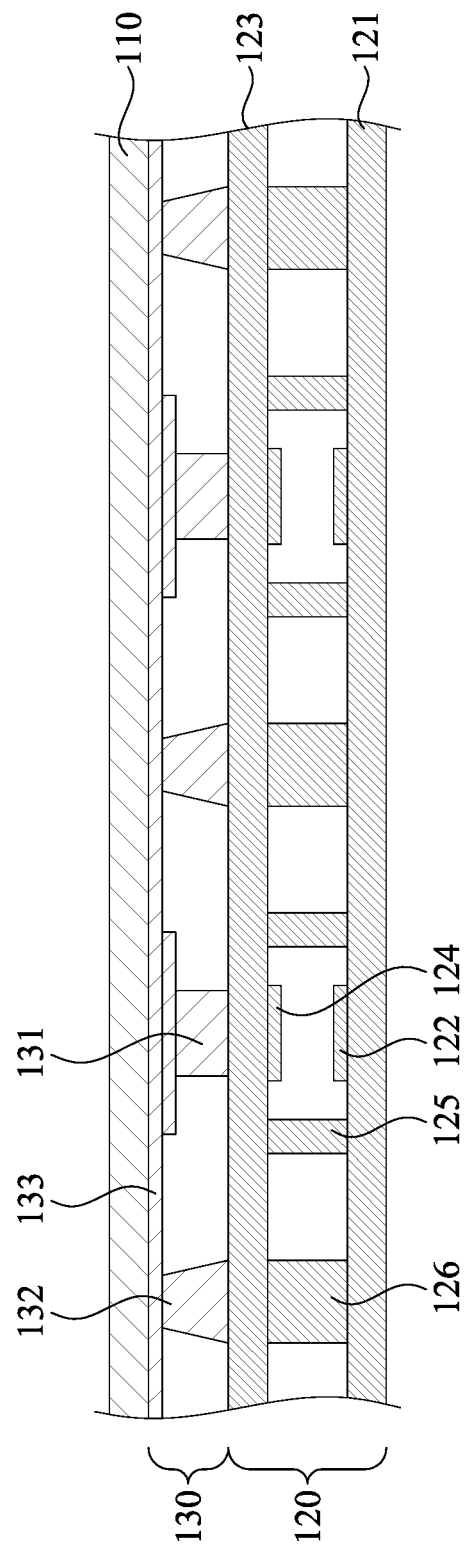
FIG. 3 is a schematic diagram of some components of the flexible display input device in FIG. 2.

Reference is made to FIGS. 1 to 3. FIG. 1 is a perspective view of a flexible display input device 100 according to an embodiment of the present disclosure. FIG. 2 is a schematic diagram of the flexible display input device 100 according to an embodiment of the present disclosure. FIG. 3 is a schematic diagram of some components of the flexible display input device 100 in FIG. 2. As shown in FIGS. 1 to 3, in the present embodiment, the flexible display input device 100 includes a first housing 100a and a second housing 100b. The second housing 100b is rotatably connected to the first housing 100a. For example, the second housing 100b is rotatably connected to the first housing 100a through a hinge (not shown), but the present disclosure is not limited in this regard. In practical applications, the second housing 100b may be connected to the first housing 100a through a flexible material. The flexible display input device 100 shown in FIG. 1 is a notebook computer as an example, but the present disclosure is not limited in this regard. In practical applications, the flexible display input device 100 may be an electronic device with a bendable screen, such as a smart phone, a tablet computer, or other similar electronic products.

As shown in FIGS. 2 and 3, in the present embodiment, the flexible display input device 100 includes a flexible display layer 110 and a keyswitch layer 120. The keyswitch layer 120 is disposed under the flexible display layer 110 and includes a first elastic film 121, a plurality of first electrodes 122, a second elastic film 123, and a plurality of second electrodes 124. The first electrodes 122 are disposed on a side of the first elastic film 121 facing toward the flexible display layer 110. The second elastic film 123 is located between the flexible display layer 110 and the first elastic film 121. The second electrodes 124 are disposed on a side of the second elastic film 123 facing toward the first elastic film 121 and are respectively opposite to the first electrodes 122 (i.e., aligned vertically). When one of the first electrodes 122 and a corresponding one of the second electrodes 124 are in contact with each other, a corresponding keyswitch signal can be generated.

Under the aforementioned structural configurations, the flexible display layer 110 can be used to display an input interface (such as a virtual keyboard), and the keyswitch layer 120 under the flexible display layer 110 can be used as the physical trigger mechanism of the input interface, so the flexible display input device 100 not only can effectively solve the problem of accidental touch when using a conventional capacitive touch module as an input device, but also improve tactile feedback.

In some embodiments, the flexible display layer 110 is an organic light-emitting diode (OLED) display panel, but the present disclosure is not limited in this regard.

As shown in FIG. 3, in the present embodiment, the keyswitch layer 120 further includes a plurality of spacing structures 125. The spacing structures 125 are disposed and contacted between the first elastic film 121 and the second elastic film 123. Hence, the spacing structures 125 can maintain a predetermined separation distance between the first elastic film 121 and the second elastic film 123, so as to prevent the first electrodes 122 and the second electrodes 124 from contacting each other when the keyswitch layer 120 is not pushed.

In some embodiments, at least one of the spacing structures 125 is ring-shaped and surrounds the corresponding first electrode 122 and the corresponding second electrode 124, but the present disclosure is not limited in this regard. In some other embodiments, at least one of the spacing structures 125 may also include a plurality of spacing blocks arranged annularly around the corresponding first electrode 122 and the corresponding second electrode 124.

As shown in FIG. 3, in the present embodiment, the keyswitch layer 120 further includes a plurality of supporting structures 126. The supporting structures 126 are disposed and contacted between the first elastic film 121 and the second elastic film 123. A lateral distance from one of the supporting structures 126 to the adjacent first electrode 122 and the second electrode 124 is greater than a lateral distance from one of the spacing structures 125 to the adjacent first electrode 122 and the second electrode 124. In other words, the spacing structure 125 is closer to the adjacent first electrode 122 and the second electrode 124 in the lateral direction, and the supporting structure 126 is substantially located in the middle between two pairs of the first electrodes 122 and the second electrodes 124 in the lateral direction. In this way, the area where the keyswitch layer 120 is squeezed and deformed can be confined between two adjacent supporting structures 126, so as to effectively prevent other adjacent keyswitches from being triggered by mistake.

In some embodiments, a distance between the first elastic film 121 and the second elastic film 123 is greater than about 10 µm and less than about 100 µm, but the present disclosure is not limited in this regard. The aforementioned distance also represents the actuation stroke required when the keyswitch layer 120 is triggered, and thus provides tactile feedback.

As shown in FIG. 3, in the present embodiment, the flexible display input device 100 further includes a trigger layer 130. The trigger layer 130 is disposed between the flexible display layer 110 and the keyswitch layer 120 and includes a plurality of trigger members 131. Each of the trigger members 131 is configured to push the second elastic film 123 of the keyswitch layer 120 to deform the second elastic film 123, so that the corresponding second electrode 124 on the second elastic film 123 moves downward to contact the corresponding first electrode 122 on the first elastic film 121. In other words, each of the trigger members 131 is aligned with a corresponding pair of the first electrode 122 and the second electrode 124 vertically. By using the trigger members 131 to trigger the keyswitch layer 120, the accuracy of triggering the keyswitches can be increased (because the area required to trigger the keyswitch layer 120 is reduced from the pressing area of the finger to the bottom area of the trigger member 131), and the displacement of the flexible display layer 110 when pressed is reduced.

As shown in FIG. 3, in the present embodiment, the trigger layer further includes a plurality of supporting members 132. The supporting members 132 are disposed between the flexible display layer 110 and the second elastic film 123. Each of the supporting members 132 is substantially located in the middle between two pairs of first electrodes 122 and second electrodes 124 in the lateral direction. In this way, the area where the keyswitch layer 120 is squeezed and deformed can be limited between adjacent two of the supporting members 132, thereby effectively avoiding false triggering of other adjacent keyswitches.

As shown in FIG. 3, in the present embodiment, the supporting members 132 of the trigger layer 130 and the supporting structures 126 of the keyswitch layer 120 are substantially aligned with each other with the second elastic film 123 therebetween, but the present disclosure is not limited in this regard. In practical applications, the supporting members 132 of the trigger layer 130 may be omitted and only the supporting structures 126 of the keyswitch layer 120 are retained, or the supporting structures 126 of the keyswitch layer 120 may be omitted and only the supporting members 132 of the trigger layer 130 are retained.

As shown in FIG. 3, in the present embodiment, the trigger layer 130 further includes a base layer 133. The base layer 133 is disposed on a side of the flexible display layer 110 facing the keyswitch layer 120, and the trigger members 131 and the supporting members 132 are disposed on a side of the base layer 133 facing the keyswitch layer 120. In other words, the trigger members 131 and the supporting members 132 are connected to the base layer 133. In this way, the trigger layer 130 including the trigger members 131, the supporting members 132, and the base layer 133 may be manufactured in the same molding process and may be integrally transferred between the flexible display layer 110 and the keyswitch layer 120 for stacking.

In some other embodiments, the trigger layer 130 may omit the base layer 133. That is, the trigger members 131 and the supporting members 132 are separated from each other. For example, the trigger members 131 and the supporting members 132 may be manufactured on the side of the flexible display layer 110 facing the keyswitch layer 120 or the side of the keyswitch layer 120 facing the flexible display layer 110 by a printing process.

In some embodiments, with reference to FIG. 1, the keyswitch layer 120 is disposed on the first housing 100a. The flexible display layer 110 covers the keyswitch layer 120, and the flexible display layer 110 extends from the first housing 100a to the second housing 100b. In other words, the keyswitch layer 120 does not extend to the second housing 100b. In some other embodiments, the flexible display layer 110 may be disposed only on the first housing 100a, and the flexible display input device 100 may further include a display panel disposed on the second housing 100b. In some other embodiments, the keyswitch layer 120 may be disposed on the second housing 100b.

As shown in FIG. 2, in the present embodiment, the flexible display input device 100 further includes a polarizer 140, a touch layer 150, a glass layer 160, and a protective cover plate 170. The polarizer 140, the touch layer 150, the glass layer 160, and the protective cover plate 170 are sequentially stacked on the flexible display layer 110 from bottom to top. The protective cover plate 170 has a peripheral light-shielding layer 171 to cover the traces on the periphery of the flexible display layer 110. The polarizer 140 and the touch layer 150 may be bonded through the bonding layer 190a. The touch layer 150 and the glass layer 160 may be bonded through the bonding layer 190b. The glass layer 160 and the protective cover plate 170 may be bonded through the bonding layer 190c. The polarizer 140 can increase the optical performance of the image displayed by the flexible display layer 110. The touch layer 150 can provide the touch sensing function to the flexible display input device 100. The glass layer 160 can provide a stress support effect when the flexible display input device 100 is still flexible. The protective cover plate 170 can protect the lower layers to prevent the lower layers from being scratched. In practical applications, at least one of the polarizer 140, the touch layer 150, the glass layer 160, and the protective cover plate 170 may be flexibly omitted according to actual requirements.

In some embodiments, the touch layer 150 includes a metal grid, an indium tin oxide (ITO) electrode layer, or a silver nanowire electrode layer, but the present disclosure is not limited in this regard.

In some embodiments, the glass layer 160 has a thickness between about 10 µm and about 300 µm. Preferably, the glass layer 160 has a thickness of about 50 µm. The thickness in this range makes the glass layer 160 thin enough and can provide sufficient stress support effect. Therefore, the glass layer 160 is an ultra-thin glass layer.

Figure 4:
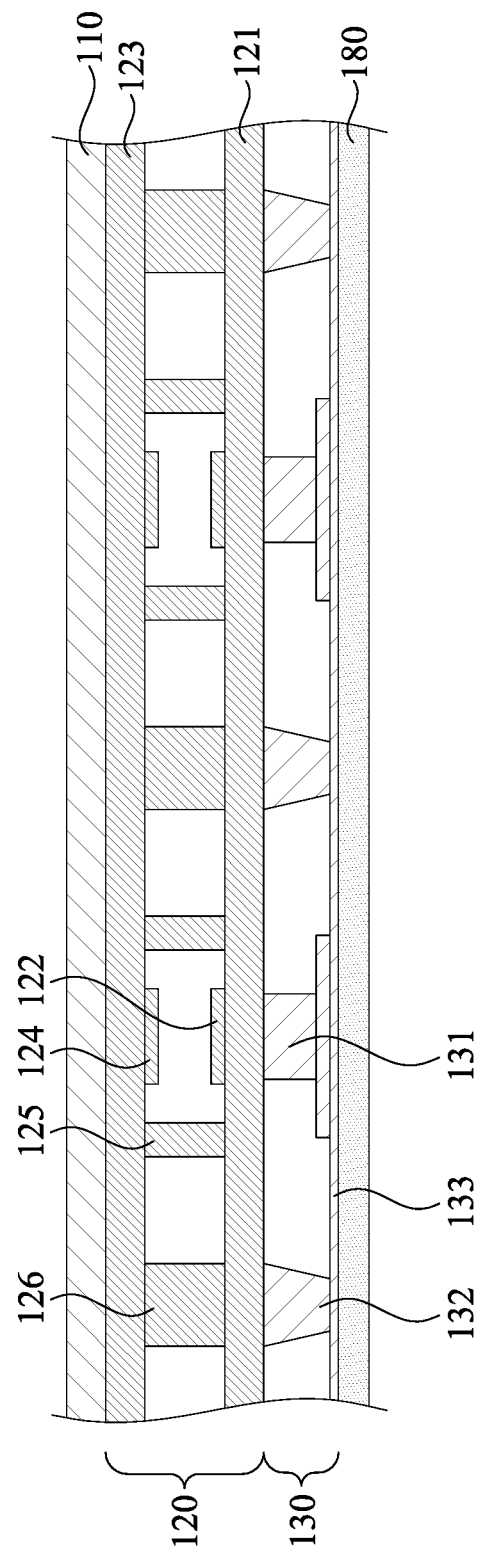
FIG. 4 is a schematic diagram of some components of a flexible display input device according to another embodiment of the present disclosure.

Reference is made to FIG. 4. FIG. 4 is a schematic diagram of some components of a flexible display input device 100 according to another embodiment of the present disclosure. As shown in FIG. 4, in the present disclosure, the flexible display input device 100 also includes a flexible display layer 110, a keyswitch layer 120, and a trigger layer 130. Therefore, the detailed structures of these components can referenced with respect to the related content above and will not be repeated here. It should be noted that the difference between the present embodiment and the embodiment shown in FIG. 3 is that the keyswitch layer 120 in the present embodiment is disposed between the flexible display layer 110 and the trigger layer 130. In addition, the flexible display input device 100 of the present embodiment further includes a support plate 180. The support plate 180 is disposed on a side of the trigger layer 130 away from the keyswitch layer 120 and is configured to support and maintain the level of the trigger layer 130. With the aforementioned structural configurations, when the user presses down on the flexible display layer 110, due to the pressing area of the finger being larger than the top area of the trigger member 131, although the range of the deformed part of the second elastic film 123 pushed downward by the flexible display layer 110 is larger than the range of the deformed part of the first elastic film 121 pushed upward by the trigger member 131, the downward displacement of the deformed part of the second elastic film 123 will be smaller than the upward displacement of the deformed part of the first elastic film 121. It can be seen from this that when the keyswitch layer 120 is triggered, it is mainly the first electrode 122 on the first elastic film 121 moving upward to contact the second electrode 124 on the second elastic film 123.

According to the foregoing recitations of the embodiments of the disclosure, it can be seen that in the flexible display input device of the present disclosure, the flexible display layer can be used to display an input interface (such as a virtual keyboard), and the keyswitch layer under the flexible display layer can be used as the physical trigger mechanism of the input interface, so it not only can effectively solve the problem of accidental touch when using a capacitive touch module as an input device, but also improve tactile feedback. By triggering the keyswitch layer by the trigger member of the trigger layer disposed under the flexible display layer, the accuracy of triggering keyswitches can be increased (because the area required to trigger the keyswitch layer becomes smaller), and the displacement of the flexible display layer when pressed is reduced. By providing the supporting structure in the keyswitch layer and/or the supporting member in the trigger member, the area where the keyswitch layer is squeezed and deformed can be limited, thereby effectively avoiding false triggering of other adjacent keyswitches.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A flexible display input device, comprising:
   a flexible display layer;
   a keyswitch layer disposed under the flexible display layer and comprising:
      a first elastic film;
      a first electrode disposed on a side of the first elastic film facing toward the flexible display layer;
      a second elastic film located between the flexible display layer and the first elastic film; and
      a second electrode disposed on a side of the second elastic film facing toward the first elastic film and opposite to the first electrode;
   a first housing; and
   a second housing rotatably connected to the first housing, wherein the keyswitch layer is disposed on the first housing and the flexible display layer covers the keyswitch layer.

2. The flexible display input device of claim 1, wherein the keyswitch layer further comprises a spacing structure, and the spacing structure is disposed and contacted between the first elastic film and the second elastic film.

3. The flexible display input device of claim 2, wherein the keyswitch layer further comprises a supporting structure, the supporting structure is disposed and contacted between the first elastic film and the second elastic film, and a lateral distance from the supporting structure to the first electrode and the second electrode is greater than a lateral distance from the spacing structure to the first electrode and the second electrode.

4. The flexible display input device of claim 2, further comprising a trigger layer, the trigger layer being stacked with the keyswitch layer and comprising a trigger member, wherein the trigger member is configured to push the keyswitch layer to make the first electrode contact the second electrode.

5. The flexible display input device of claim 4, wherein the trigger layer is disposed between the flexible display layer and the keyswitch layer.

6. The flexible display input device of claim 5, wherein the trigger layer further comprises a supporting member disposed between the flexible display layer and the second elastic film, and the trigger member is configured to push the second elastic film.

7. The flexible display input device of claim 6, wherein the keyswitch layer further comprises a supporting structure, and the supporting structure is disposed and contacted between the first elastic film and the second elastic film, and is aligned with the supporting member through the second elastic film.

8. The flexible display input device of claim 4, wherein the keyswitch layer is disposed between the flexible display layer and the trigger layer.

9. The flexible display input device of claim 8, wherein the trigger layer further comprises a supporting member disposed on and contacted with a side of the first elastic film away from the second elastic film, and the trigger member is configured to push the first elastic film.

10. The flexible display input device of claim 9, wherein the keyswitch layer further comprises a supporting structure, the supporting structure is disposed and contacted between the first elastic film and the second elastic film, and is aligned with the supporting member through the first elastic film.

11. The flexible display input device of claim 9, further comprising a supporting plate, wherein the trigger member is disposed on and contacted with a side of the supporting plate facing the keyswitch layer, and the supporting member is disposed and contacted between the first elastic film and the supporting plate.

12. The flexible display input device of claim 1, wherein a distance between the first elastic film and the second elastic film is greater than about 10 μm and less than about 100 μm.

13. The flexible display input device of claim 1, further comprising a polarizer disposed on a side of the flexible display layer away from the keyswitch layer.

14. The flexible display input device of claim 1, further comprising a touch layer disposed on a side of the flexible display layer away from the keyswitch layer.

15. The flexible display input device of claim 1, further comprising a glass layer disposed on a side of the flexible display layer away from the keyswitch layer.

16. The flexible display input device of claim 1, further comprising a protective cover plate disposed on a side of the flexible display layer away from the keyswitch layer and having a peripheral light-shielding layer.

17. The flexible display input device of claim 1, wherein the flexible display layer extends from the first housing to the second housing.

18. A flexible display input device, comprising:
a flexible display layer; and
a keyswitch layer disposed under the flexible display layer and comprising:
  a first elastic film;
  a first electrode disposed on a side of the first elastic film facing toward the flexible display layer;
  a second elastic film located between the flexible display layer and the first elastic film, wherein a distance between the first elastic film and the second elastic film is greater than about 10 μm and less than about 100 μm; and
  a second electrode disposed on a side of the second elastic film facing toward the first elastic film and opposite to the first electrode.

19. A flexible display input device, comprising:
a flexible display layer;
a keyswitch layer disposed under the flexible display layer and comprising:
  a first elastic film;
  a first electrode disposed on a side of the first elastic film facing toward the flexible display layer;
  a second elastic film located between the flexible display layer and the first elastic film; and
  a second electrode disposed on a side of the second elastic film facing toward the first elastic film and opposite to the first electrode;
a first housing; and
a second housing rotatably connected to the first housing, wherein the keyswitch layer is disposed on the second housing and the flexible display layer covers the keyswitch layer.

20. The flexible display input device of claim 19, wherein the flexible display layer extends from the first housing to the second housing.

* * * * *